3,002,953
PROCESS FOR PRODUCING POLYMERIZATES

Johann Sixt, Munich, Germany, assignor to Wacker-Chemie G.m.b.H., Munich, Germany, a corporation
No Drawing. Filed Jan. 28, 1957, Ser. No. 636,476
Claims priority, application Germany Feb. 1, 1956
6 Claims. (Cl. 260—78.5)

This invention relates to the production of polymerizates, and it has for its object to provide a novel and improved process for this purpose.

Another object of the invention is to provide a simple and efficient process for producing mercury—containing polymerizates.

Various other objects and advantages will be apparent as the nature of the invention is more fully disclosed.

The process, according to the invention, consists fundamentally in that a vinyl ester and maleic acid are polymerized in the presence of mercury compounds, particularly mercury oxides or mercury salts, as well as small quantities of concentrated sulfuric acid. Preferably mercury oxide or mercury salts, e.g. mercury sulfate, are employed as mercury compounds. The quantity of the added mercury compound conforms to the desired mercury content of the polymerizate. Preferably vinyl ester, stoichiometrically in excess as compared with the maleic acid, is employed.

In the simplest embodiment of the invention a mixture of excess vinyl ester, e.g. vinyl acetate or vinyl propionate, and maleic acid is mixed with mercuric oxide and a small quantity of concentrated sulfuric acid, and polymerized while being stirred for several hours at room temperature. The application of higher temperatures does not afford any special advantage. The polymerizate precipitates as a white deposit, which is separated and rewashed with the vinyl ester, during which further polymerizate precipitates from this. Thereupon the entire deposit of vinyl ester and some carboxylic acid is liberated by drying, so that a light, dry powder is obtained. It is easily soluble in water, from which the mercury cannot be separated by precipitants, such as cold soda lye, since it is manifestly a complex compound. The powder contains free carboxyl groups, which can be saturated by means of mercury salts or other salts. The powder may be used dry or in solution in many cases so that the known bactericidal properties of the mercury can be effective.

I have further found that the properties of the polymerizate change substantially, and primarily that the water solubility of the polymerizate is reduced, if the polymerization is performed with the addition of polymerizable olefin compounds. As such there may be employed, for example, styrene, vinyl toluol, acrylic nitrile, acrylic acid ester, allyl alcohol, butadiene, and the like. Furthermore, during the polymerization known cross-linking agents or wetting media, such as vinyl crotonate, or vinyl ester of dicarboxylic acid, e.g. succinic acid vinyl ester, may be added. The polymerization may be performed, besides at room temperature, also at an elevated temperature, e.g. 40–60° C. The speed of polymerization increases thereby and the addition of mercury compounds may be thereby reduced, with an increase of the viscosity of the polymerization product. Maleic acid anhydride may also be used instead of maleic acid, without there being any change in the conversion. The reduction of the water solubility of the polymerizate is of advantage, for example in applications for bactericidal purposes. The polymerizates are plastic under heat, soluble in various organic compounds, e.g. ketones, dimethyl formamide, diethyl sulfoxide, and the like. The solubility in water is increased with the addition of alkalies or ammonia or ammonium compounds, e.g. amines, such as ethyl amines or the like. It is also possible to separate the mercury from the mercury-containing polymerizate with strong acids, e.g. dilute sulfuric acid. Thereby the polymerizates may be used for various purposes, in which the mercury is a disturbing factor because of its poisonousness, e.g. for pressed masses or for varnish-technical purposes. The mercury-free polymerizates come into consideration also for other polymerizations, for example, as co-polymerizates.

Example 1

In a mixture of 180 g. vinyl acetate, 36 g. of styrene, 2.7 g. of mercuric acetate, and 0.15 g. of concentrated sulfuric acid there is dissolved 40 g. of maleic acid, with stirring. The temperature rises slightly due to the reaction heat of the polymerization which develops after some time, and in the course of several hours a pure white powdery precipitate of the mixed polymerization product is obtained. It is filtered off, rewashed with vinyl acetate and dried at an elevated temperature. The output amounts to 80 g. In order to free it from mercury, if necessary, it is stirred with a 20% strength hydrochloric acid of a quantity of 300 cu. cm. for ¼ hour, at room temperature. Thereupon the filtering off is done and the mercury-free, and somewhat swollen, product is then dried. It dissolves easily in diluted ammonia to form a strongly viscous fluid.

Example 2

The process is performed as in Example 1 with the difference that instead of maleic acid, maleic acid anhydride is used. The beginning of the polymerization is thereby somewhat retarded, and yet with good output 85 g. of polymerizate is obtained. The product can be treated, as in Example 1, with dilute hydrochloric acid. The solubility in ammonia is the same. The viscosity of the solution is somewhat higher.

Example 3

The process of Example 1 is repeated, using 18 g. styrene and as catalyst 4.5 g. of mercuric acetate and 0.3 g. of concentrated sulfuric acid. The product obtained can be treated with dilute hydrochloric acid, as in Example 1, with a slight swelling resulting. The acidy fluid can be separated, however, rather well. The output amounts to about 91 g. The viscosity of the ammoniacal solution is only slightly changed. The solubility in organic liquids, particularly in acetone, is better.

Example 4

The same process is used as in Example 3, but with an addition of 5.4 g. vinyl crotonate. The product obtained shows in water only a very slight swellability, so that the extraction may be done easily with dilute hydrochloric acid. The viscosity of the ammoniacal solution has further risen considerably, to some extent to jelly-like consistency. A homogeneous solution is, however, obtained through energetic stirring.

Example 5

In a mixture of 180 g. vinyl acetate, 35 g. acrylic nitrile, 4.5 g. of mercuric acetate, and 0.3 g. of concentrated sulfuric acid, 40 g. of maleic acid are dissolved while being stirred. After a certain time a white polymerizate is precipitated, which is filtered off, washed with vinyl acetate and dried. The output amounts to 75 g. It is practically insoluble in water, but very soluble in aqueous ammonia, amines, or alkalis.

Example 6

To the procedure of Example 5 there is added further 3 g. of divinyl succinic acid ester as wetting medium.

As to all else the process is the same as described there. The output in polymerizate amounts to 76 g. The product is also practically insoluble in water, but somewhat less soluble in aqueous ammonia than in Example 5.

The invention claimed is:
1. Process for producing a complex polymerizate compound containing mercury in the absence of peroxides which comprises polymerizing a mixture of vinyl acetate and a member of the group consisting of maleic acid and maleic anhydride, at a temperature of from room temperature to 60° C., in the presence of at least 1.5 percent by weight, based on the vinyl acetate, of mercuric acetate and from about 0.08 percent to about 0.16 percent of concentrated sulfuric acid as catalyst, said vinyl acetate being employed in a molar excess of up to five times in relation to said member.

2. Process according to claim 1, in which the polymerization is effected in the presence of at most 20 percent by weight, based on the vinyl acetate, of a polymerizable olefin compound selected from the group consisting of styrene, vinyl toluene, acrylic nitrile, allyl alcohol and butadiene.

3. Process according to claim 1, in which the polymerization is effected in the presence of a cross-linking agent consisting of 3 percent by weight, based on the vinyl acetate, of vinyl crotonate.

4. Process according to claim 1, in which the polymerization is effected in the presence of a cross-linking agent consisting of 1.7 percent by weight, based on the vinyl acetate, of succinic acid vinyl diester.

5. Process according to claim 1, in which the polymerizate product is treated with an acid to separate mercury from the polymerizate complex.

6. Process for producing a complex polymerizate compound including mercury which comprises mixing, in substantially the following relative proportions by weight, 560 parts of vinyl acetate, 130 parts of a member of the group consisting of maleic acid and maleic acid anhydride, 8 to 14 parts of mercuric acetate, and 0.5 to 1 part of concentrated sulphuric acid, and polymerizing said mixture at a temperature from room temperature to 60° C.

References Cited in the file of this patent
UNITED STATES PATENTS

| | | |
|---|---|---|
| 2,045,080 | Hagedom | June 23, 1936 |
| 2,380,474 | Stewart | July 31, 1945 |
| 2,380,476 | Stewart | July 31, 1945 |
| 2,402,484 | Adelson et al. | June 18, 1946 |
| 2,597,440 | Bodamer | May 20, 1952 |
| 2,698,264 | Niles | Dec. 28, 1954 |
| 2,726,230 | Carlson | Dec. 6, 1955 |
| 2,849,426 | Miller | Aug. 26, 1958 |
| 2,873,263 | Lal | Feb. 10, 1959 |

OTHER REFERENCES

Partington: A Text-Book of Inorganic Chemistry, 6th edition (1953), McMillan and Co., page 464.